United States Patent [19]

Ogawa et al.

[11] Patent Number: 5,599,864
[45] Date of Patent: Feb. 4, 1997

[54] POLYARYLENE SULFIDE RESIN COMPOSITION AND OPTICAL PICK-UP PARTS FORMED FROM THE SAME

[75] Inventors: Shogo Ogawa; Hajime Hata, both of Kagawa; Ikuo Kasuga, Nagano; Hiromasa Marumo, Nagano; Masamichi Hayakawa, Nagano, all of Japan

[73] Assignees: Kabushiki Kaisha Sankyo Seiki Seisakusho, Nagano; Shikoku Chemicals Corporation, Kagawa, both of Japan

[21] Appl. No.: 316,470

[22] Filed: Oct. 3, 1994

[30] Foreign Application Priority Data

Oct. 1, 1993 [JP] Japan ................... 5-269555
Nov. 17, 1993 [JP] Japan ................... 5-312605

[51] Int. Cl.⁶ .................. C08K 3/38; C08K 5/01
[52] U.S. Cl. .................. 524/405; 524/59; 524/474; 524/609
[58] Field of Search ............... 524/59, 405, 474, 524/609

[56] References Cited

U.S. PATENT DOCUMENTS

| | | | |
|---|---|---|---|
| 3,274,165 | 9/1966 | Lenz et al. | 260/79 |
| 4,365,037 | 12/1982 | Adachi et al. | 524/449 |
| 4,705,648 | 11/1987 | Reichert et al. | 252/512 |
| 4,785,057 | 11/1988 | Shiiki et al. | 525/537 |
| 4,870,123 | 9/1989 | Nelson | 524/490 |
| 4,885,321 | 12/1989 | Nitoh et al. | 523/219 |
| 4,962,999 | 10/1990 | Kasuga | 350/247 |
| 5,227,427 | 7/1993 | Serizawa et al. | 524/574 |
| 5,384,196 | 1/1995 | Inoue et al. | 428/411.1 |

FOREIGN PATENT DOCUMENTS

| | | |
|---|---|---|
| B44-27671 | 11/1969 | Japan . |
| B45-3368 | 2/1970 | Japan . |
| A3-66756 | 3/1991 | Japan . |

*Primary Examiner*—Kriellion S. Morgan
*Attorney, Agent, or Firm*—Sughrue, Mion, Zinn, Macpeak & Seas

[57] ABSTRACT

A polyarylene sulfide resin composition having an excellent fluidability and a good moldability is disclosed. The resin composition is useful as a material for an optical pick-up part which has a high reliability and a high tenacity and does not generate deviation of an optical axis with changes in environmental conditions such as temperature and humidity. The polyarylene sulfide resin composition comprises, as main components, a polyarylene sulfide resin, a fibrous filler and a particulate filler, and, optionally, a silane coupling agent and an alicyclic hydrocarbon.

14 Claims, No Drawings

POLYARYLENE SULFIDE RESIN COMPOSITION AND OPTICAL PICK-UP PARTS FORMED FROM THE SAME

FIELD OF THE INVENTION

This invention relates to a polyarylene sulfide resin composition used for optical pick-up parts mounted in an optical disk device such as a video disk player, a digital audio player and the like, and to optical pick-up parts formed from the polyarylene sulfide resin composition.

BACKGROUND OF THE INVENTION

An optical pick-up is generally composed of an optical element such as a light-emitting element, a light-receiving element and a mirror, an optical frame for fixing these optical elements, an actuator part for moving an objective lens and an objective lens holder following the movement of the optical disk, and a base frame which maintains an actuator part and forms an optical pass to the optical frame.

The optical frame is required to have dimensional stability for maintaining a relative position of the optical elements at a constant relationship, and the base frame is required to have a mechanical strength so as to be free from resonance with the movement of the actuator. In many cases, articles molded by metal die casting such as aluminum are generally used for these parts.

Recently, engineering plastics are partially put into a practical use as a metal substitute for reducing the weight of the parts and lowering the cost of parts. However, in applying these plastics for thin portable type optical devices which require a higher strength of materials or for mounting these plastics on automobiles which are often encountered severe environmental conditions, more excellent mechanical strength and dimensional stability are required for the engineering plastics.

Known materials satisfying these requirements include polyphenylene sulfide (PPS) and liquid crystal polymers (LCP), but the liquid crystal polymers have problems in that anisotropy in elasticity and linear expansion coefficient is increased in a machine direction at the time of molding and a vertical direction thereto. Also, the polyphenylene sulfide resin composition described in JP-A-3-66756 (the term "JP-A" as used herein means an unexamined published Japanese patent application) does not show such an anisotropy observed in the liquid crystal polymers and is capable of producing a molded article having a high resonant frequency region due to its high elasticity. However, since the above-described known polyarylene sulfide resin composition employs a particulate filler having a high specific gravity of 3.5 or more, the particulate filler tends to be localized by precipitation due to its high specific gravity and, hence, a molded article in which the particulate fillers are dispersed stably is difficult to obtain. Such molded articles tend to cause deviation in the optical axis with changes in the environmental conditions and thus are not suitable to the use for optical pick-up parts which require high reliability.

Further, in the optical pick-up parts formed by using the polyphenylene sulfide resin composition, a large amount of fillers is generally used therein so as not to cause deviation in the optical axis with changes in the environmental conditions such as temperature and humidity and, as a result, the article molded from such a resin composition has a high brittleness and an insufficient tenacity. Thus, the molded articles have various problems such as generation of breakage in a mounting step due to insufficient thread cutting strength and generation of cracks in a metal press fitting.

SUMMARY OF THE INVENTION

An object of the present invention is to provide a polyarylene sulfide resin composition having a high elasticity, an excellent fluidability and a good moldability which is suitable as a material for optical pick-up parts having a high reliability and causing no deviation in an optical axis with changes in environmental conditions.

Another object of the present invention is to provide optical pick-up parts having a high reliability and a high tenacity and causing no deviation in the optical axis with changes in environmental conditions such as temperature and humidity.

As a result of extensive studies under the above-described circumstances, the present inventors have found that the conventional problems can be solved by the polyarylene sulfide resin composition according to the present invention, in particularly, the resin compositions described hereinafter in detail in embodiments I and II, and completed the present invention.

DETAILED DESCRIPTION OF THE INVENTION

Typical examples of the polyarylene sulfide resin used in the resin composition of the present invention are polyphenylene sulfide and copolymers thereof.

Polyphenylene sulfide is a polymer which can be synthesized by the method disclosed in, for example, JP-B-44-27671 and JP-B-45-3368 (the term "JP-B" as used herein means an examined Japanese patent publication), and U.S. Pat. No. 3,274,165, and comprises a repeating unit represented by the following formula, preferably comprising at least 80 mol % of the repeating unit of the formula:

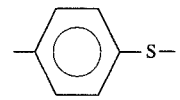

In the present invention, polyphenylene sulfide may contain less than 20 mol % of a group having the bond represented by the following formulae as a copolymerizable component:

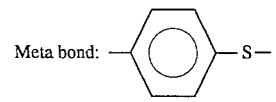

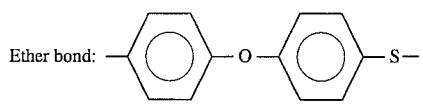

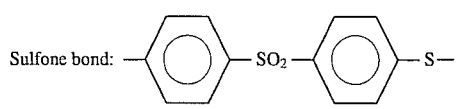

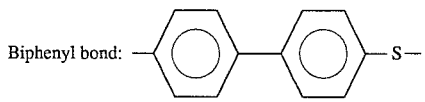

Substituted sulfide bond: 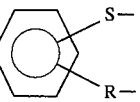

(wherein R represents a substituent such as an alkyl group, a nitro group, a phenyl group and an alkyl group)

Trifunctional phenyl sulfide bond:

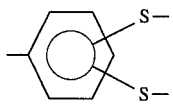

Examples of these resins include cross-linkable resins having a relatively low molecular weight and a low viscosity, and linear type resins having a high molecular weight and a high viscosity, and various grades of the resins are commercially available. In the present invention, these resins can be used alone or in admixture.

The polyarylene sulfide resin composition according to the present invention is excellent in the fluidability of the resin at the time of molding, and produces molded articles having a high dimensional precision without directional property in the molded articles. Further, the optical pick-up parts obtained by using the polyarylene sulfide resin composition of the present invention are highly reliable since the parts have only a very low level of resonance and do not generate a deviation of optical axis under severe environmental conditions, and also are suitable for mass production.

In addition, the optical pick-up parts obtained by using the polyarylene sulfide resin composition of the present invention are excellent in tenacity as compared with the optical pick-up parts molded from conventional resin compositions and, therefore, an assembling strength and reliability thereof required for a frame structure such as fixing of screws and press fitting of parts can be markedly improved.

The present invention is further described in detail with reference to specific embodiments thereof.

Embodiment I

In embodiment I, examples of the fibrous fillers to be used in the resin composition include a glass fiber, a carbon fiber, a tirano fiber, wollastonite, a potassium titanate fiber and a ceramic fiber such as an aluminum borate fiber; metal fibers; and organic fibers such as an aromatic polyaramide fiber, and, from the standpoint of economy and performance, a glass fiber is preferred.

The length of the glass fiber in the kneaded resin composition is from about 0.1 to 1 mm, preferably from 0.2 to 0.5 mm. Since the glass fiber is liable to break upon kneading with the resin, a glass fiber having a length of from about 2 mm to about 5 mm and a fiber diameter of from about 5 μm to about 20 μm, preferably from 7 to 15 μm prior to the kneading is generally used. A glass fiber having a fiber diameter more than 20 μm is not preferred since a kneading efficiency with the resin decreases.

Examples of particulate fillers to be used in the resin composition include aluminum borate, silica, talc, mica and blast furnace slag each having a specific gravity lower than 3.5. In particular, aluminum borate and blast furnace slag are preferred since these fillers are stable during the molding, produce good surface conditions in the molded articles, a high dimensional precision, and does not generate a deviation in the optical axis with changes in environmental conditions.

In carrying out the embodiment I according to the present invention, the nature of aluminum borate used as a particulate filler is not particularly limited, but is preferably that having a particle diameter of 8 μm or more. The filler having a particle size smaller than 8 μm is not preferred since the filler adversely affects the fluidability of the resin as well as the surface conditions of the molded articles. Further, a nature of blast furnace slag used as a particulate filler also is not particularly limited.

A mixing ratio of each of the components in the resin composition of the embodiment I is from 20 to 40% by weight, preferably from 25 to 40% by weight, of a polyarylene sulfide resin, from 10 to 55% by weight, preferably from 15 to 30% by weight, of a fibrous filler, and from 5 to 60% by weight, preferably from 35 to 50% by weight, of a particulate filler having a specific gravity lower than 3.5. When the mixing ratio of each of the components is outside the above range, problems may occur such that the moldability of the resin composition is deteriorated and the performance of the resin composition decreases.

Further, additives such as a stabilizer and an antioxidant may be added to the resin composition of the present invention in an amount which does not adversely affect the performance of the resin composition for the optical pick-up.

In embodiment I, the specific gravity of the resin composition for the optical pick-up is not particularly limited, but is generally 1.7 or more, preferably in the range of from 1.9 to 2.1. When the specific gravity is lower than 1.7, a modulus of elasticity of the resin reduces whereby the resonant frequency characteristics are deteriorated and may be affected by a servo mechanism.

The resin composition according to the embodiment I can be prepared by a conventional method, for example, by a method for mixing the components using a mixer such as a ribbon blender, a tumbling mixer and a Henschel mixer, followed by melt blending, or a method for simultaneously mixing and blending the components using a mixer such as a Banbury mixer and a screw mixer. Also, molded articles can be obtained by blending the components to form pellets and injection molding the pellets into the desired articles.

Embodiment II

In embodiment II, as embodiment I described above, typical examples of the fillers to be used in the resin composition include fibrous fillers and particulate fillers. Typical examples of fibrous fillers include a glass fiber, a carbon fiber, a tirano fiber, wollastonite, a potassium titanate fiber and a ceramic fiber such as an aluminum borate fiber; organic fibers such as an aromatic polyaramide fiber; and metal fibers. Also, typical examples of the particulate fillers include aluminum borate, silica, talc, mica, zinc oxide and blast furnace slag.

Typical examples of silane coupling agents to be incorporated into the polyarylene sulfide resin of the embodiment II include vinyltris (β-methoxy)silane, vinyltriethoxysilane, vinyltrimethoxysilane, γ-methacryloxypropyltrimethoxysilane, γ-glycidoxypropyl-trimethoxysilane, γ-glycidoxypropylmethyldiethoxysilane, N-β-(aminoethyl)-γ-aminopropyl trimethoxysilane, N-β-(aminoethyl)-γ-aminopropyldimethoxysilane, γ-aminopropyltriethoxysilane and N-phenyl-γ-aminopropyltrimethoxysilane.

Typical alicyclic hydrocarbons to be incorporated into the polyarylene sulfide resin composition of the embodiment II are compounds represented by the following formula (1), and, in addition, terpenes, polyterpenes and aromatic saturated hydrocarbons can also be used as well. In particular, hydrogenated alicyclic hydrocarbons of these compounds are preferred.

Formula (1):

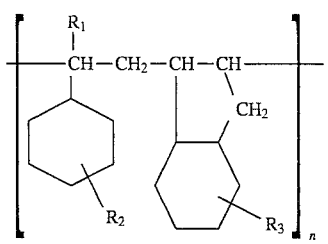

wherein $R_1$, $R_2$ and $R_3$ each represents a hydrogen atom or an alkyl group and n is an integer.

The resin composition used for optical pick-up parts according to the embodiment II of the present invention comprises from 20 to 90% by weight of a polyarylene sulfide resin, from 10 to 75% by weight of a filler, from 0.05 to 5% by weight of a silane coupling agent, and from 0.05 to 5% by weight of an alicyclic hydrocarbon, and both components of the polyarylene sulfide resin and the filler are used at a proportion of from 90 to 99.9% by weight, and both components of the silane coupling agent and the alicyclic hydrocarbon are used at a proportion of from 0.1 to 10% by weight. When the mixing ratio of each of the components is outside the above range, problems may occur such that the moldability of the resin composition is deteriorated and the performance of the resin composition decreases.

As described above, the embodiment II essentially requires the use of a silane coupling agent and an alicyclic hydrocarbon. By using these components in the resin composition, the surface adhesion strength between matrix (polyarylene sulfide resin) and the filler is increased and as a result the strength of the composite is increased.

Further, additives such as a stabilizer and an antioxidant may be added to the resin composition of the present invention in an amount which does not adversely affect the performance of the resin composition for the optical pick-up.

The parts of the optical pick-up according to the embodiment II can be obtained by mixing the components using a mixer such as a ribbon blender, a tumbling mixer and a Henschel mixer, followed by melt blending, pelletizing the resulting resin composition and injecting molding the pellets into the desired molded articles, or a method for simultaneously mixing and blending the components using a mixer such as a Banbury mixer and a screw mixer. Also, molded articles can be obtained by blending the components to form pellets and injection molding the pellets into the desired articles.

Examples of optical pick-up parts formed by molding the resin composition of the present invention include a base frame (a movable support frame) which forms an optical pass with an optical frame fixing a light-emitting element (a semiconductor laser), a light-receiving element, a mirror, etc., as well as an integrated frame formed by integrating and molding these frames, as disclosed in an unexamined published Japanese utility model application No. 1-45315.

The present invention is further illustrated in greater detail by the following examples and comparative examples, but these examples are not to be construed as limiting the present invention. In these examples, Examples 1 to 5 and Comparative Examples 1 to 3 are in accordance with embodiment I, and Examples 6 to 8 and Comparative Examples 4 to 6 are in accordance with embodiment II. The raw materials used in these examples are as follows:

1. Polyphenylene sulfide resin (a heat cross-linkable type having a melt viscosity of 1,500 poise (at 320° C., a shear rate, 1,000 seconds)
2. Glass fiber (Chopped strand)
3. Aluminum borate (a true specific gravity, 2.93; a particle size, 5 to 8 μm)
4. Blast furnace slag (a true specific gravity, 2.90)
5. Precipitating Barium sulfate (a true specific gravity, 4.50; a particle diameter, 2 to 5 μm)

EXAMPLES 1 TO 3

The above-described polyphenylene sulfide resin and aluminum borate were mixed at a blending ratio shown in Table 1 below using a Henschel mixer, and blended using a biaxial extruder (TEM-35 produced by Toshiba Machine Co., Ltd.). Then, the glass fiber was charged from a side feed opening, and the mixture was pelletized by melt extruding it at a temperature of 320° C. The resulting pellets were molded into test pieces and pick-up parts by using an injection molding machine under a closing pressure of 30 tons.

After confirming that the test piece was highly elastic and free from resonance, the test piece was subjected to an evaluation test, and the pick-up part was actually mounted on a CD (compact disk) player and tested for reliability and workability under various environmental conditions. The test results obtained are shown in Table 1 below.

In these tests, the bending test was conducted in accordance with ASTM D-790; the measurement of a specific gravity was conducted in accordance with ASTM D-792; and the working test using a frame of pick-up base was conducted by mounting the pick-up part on a CD player using a temperature cycle of 25° C.→−10° C.→60° C.→25° C. Further, the resonance frequency of an optical pick-up device composed of an optical pick-up part formed by molding the resin composition of the present invention and the other parts such as lens, etc. was measured for the evaluation of the resonance point. That is, the optical pick-up device was driven and the detected signal was analyzed to determine the deflection of frequency (i.e., resonance point). Furthermore, the appearance (e.g., warpage, shrinkage, surface roughness, etc.) of the optical pick-up part formed by molding the resin composition of the present invention was visually checked for the evaluation of the moldability.

EXAMPLES 4 AND 5

Test pieces and pick-up parts were prepared from the pellets prepared in the same manner as described in Examples 1 to 3, except for using a blast furnace slag in place of aluminum borate and using the same polyphenylene sulfide resin and glass fiber as in Examples 1 to 3 at the mixing ratio shown in Table 1.

The resulting test piece and the pick-up part were then subjected to the evaluation test, and the results obtained are shown in Table 1.

COMPARATIVE EXAMPLES 1 TO 3

Test pieces and pick-up parts were obtained in the same manner as described in Examples 1 to 3 using the same polyphenylene sulfide resin and glass fiber and the mixing ratio shown in Table 1 below, except for using precipitated barium sulfate in place of aluminum borate. The resulting test pieces and the pick-up parts were then subjected to the same evaluation tests as in Examples 1 to 3, and the results obtained are shown in Table 1 below.

The test pieces and the pick-up parts prepared in Examples 1 to 5 and Comparative Examples 1 to 3 showed good moldability and had high elasticity. Also, these products did not generate resonance upon mounting on a CD player and did not show deviation of the optical axis. The products of Comparative Examples 1 to 3 exhibited a good working state at a temperature of 25° C., but, when the environmental conditions were changed, these products did not withstand the changes and generated a deviation of optical axis whereby the reading of signals became impossible and the CD player became inoperable. On the other hand, the products prepared in Examples 1 to 5 using the resin compositions of the present invention did not generate the deviation of optical axis with changes in the environmental conditions upon mounting on a CD player, and the CD player normally worked.

TABLE 1

| Resin Composition | Examples | | | | | Comparative Examples | | |
|---|---|---|---|---|---|---|---|---|
| | 1 | 2 | 3 | 4 | 5 | 1 | 2 | 3 |
| Polyarylene sulfide | 35 | 35 | 30 | 35 | 30 | 35 | 35 | 30 |
| Aluminum borate | 35 | 50 | 45 | — | — | — | — | — |
| Blast furnace slag | — | — | — | 35 | 45 | — | — | — |
| Precipitated barium sulfate | — | — | — | — | — | 35 | 50 | 45 |
| Glass fiber | 30 | 15 | 25 | 30 | 25 | 30 | 15 | 25 |
| Measured Values | | | | | | | | |
| Bending modulus of elasticity ($\times 10^4$ kgf/cm$^2$) | 24.1 | 22.0 | 25.8 | 18.5 | 17.8 | 15.8 | 14.5 | 17.4 |
| Bending strength (kg/cm$^2$) | 1870 | 1593 | 1851 | 1863 | 1843 | 1778 | 1454 | 1753 |
| Specific gravity (g/cm$^3$) | 1.96 | 2.05 | 1.99 | 1.96 | 1.99 | 2.15 | 2.37 | 2.31 |
| Resonance point | A | A | A | A | A | A | A | A |
| Moldability | A | A | A | A | A | A | A | A |
| Working test with environmental changes | | | | | | | | |
| at 25° C. | A | A | A | A | A | A | A | A |
| at −25° C. | A | A | A | A | A | A | C | C |
| at 60° C. | A | A | A | A | A | C | C | C |
| at 25° C. (again) | A | A | A | A | A | C | C | C |

Note: A stands for "good", and C stands for "poor".

EXAMPLES 6 TO 8 AND COMPARATIVE EXAMPLE 4 TO 6

Polyphenylene sulfide resin (a heat cross-linkable type having a melt viscosity, 1,500 poise (at 320° C., shear rate, 1,000 sec), a silane coupling agent (tradename: KBE903, produced by Shin-etsu Chemical Co., Ltd.), a hydrogenated alicyclic hydrocarbon (tradename: ESCOREZ 5320, produced by TONEX Co., LTD.) and aluminum borate (a true specific gravity, 2.93, a particle diameter, 5 to 8 μm) were mixed using a Henschel mixer at a proportion shown in Table 2 below, and blended in a biaxial extruder (TEM-35, produced by Toshiba Machine Co., Ltd.). Then, the glass fiber was charged from a side feed opening, and the mixture was pelletized by melt extruding it at a temperature of 320° C. The resulting pellets were molded into a test piece and a pick-up part by using an injection molding machine under a closing pressure of 30 tons.

The test pieces were then subjected to a tensile strength test and an elongation test as well as an Izod impact test for confirming the maintenance of mechanical characteristics and the improvement in tenacity. Further, the pick-up parts were actually mounted on optical devices. The results obtained by the above measurements are shown in Table 2 below. In these tests, the tensile strength test was conducted in accordance with ASTM D-638, and the Izod impact test was conducted in accordance with ASTM D-256. Further, the optical pick-up part formed by molding the resin composition of the present invention was subjected to thread cutting for evaluating the thread strength. Specifically, the optical pick-up part was subjected to tapping (M2, standard tap) and the tightening torque was increased with every 0.5 kgf.cm by a torque driver to determine the point at which the thread was broken and no clamping force occurs.

TABLE 2

| | Example | | | Comparative Example | | |
|---|---|---|---|---|---|---|
| Resin Composition | 6 | 7 | 8 | 4 | 5 | 6 |
| Polyphenylene sulfide | 34 | 33 | 33.5 | 35 | 34 | 34 |
| Aluminum borate | 50 | 50 | 50 | 50 | 50 | 50 |
| Silane coupling agent | 0.5 | 1 | 1 | — | 1 | — |
| Alicyclic hydrocarbon | 0.5 | 1 | 0.5 | — | — | 1 |
| Measured values | | | | | | |
| Tensile strength (kg/cm$^2$) | 1160 | 1172 | 1165 | 1080 | 1092 | 1089 |
| Tensile elongation (%) | 2.3 | 2.6 | 2.4 | 1.8 | 1.8 | 1.8 |
| Izod Impact strength | 4.2 | 4.5 | 4.3 | 2.9 | 3.7 | 3.5 |
| Thread cutting strength (kgf · cm) | 2.18 | 1.18 | 2.07 | 2.21 | 1.68 | 1.76 |

The molded articles in each of the examples and comparative examples showed good molding characteristics, but the molded articles produced without using both the silane coupling agent and the alicyclic hydrocarbon or either of these additives showed low measured values of tensile strength and Izod impact strength and had insufficient tenacity and low thread cutting strength. On the other hand, the molded articles of Examples 6 to 8 in which both the silane coupling agent and the hydrogenated alicyclic hydrocarbon were used showed high measured values of tensile strength and Izod impact strength, and had an improved tenacity and a markedly improved thread cutting strength. Also, the molded articles of Examples 6 to 8 showed an improved anti-cracking property when a metal is press-fitted, and a press-fitting strength could also be increased.

While the invention has been described in detail and with reference to specific embodiments thereof, it will be apparent to one skilled in the art that various changes and modifications can be made therein without departing from the spirit and scope thereof.

What is claimed is:

1. A polyarylene sulfide resin composition which comprises, as main components, from 20 to 40% by weight of a polyarylene sulfide resin, from 10 to 55% by weight of a fibrous filler and form 5 to 60% by weight of a solid particulate filler having a specific gravity lower than 3.5 wherein said resin composition has a specific gravity of 1.7 or more, and wherein said solid particulate filler is selected from the group consisting of aluminum borate and blast furnace slag.

2. A polyarylene sulfide resin composition as claimed in claim 1, wherein said particulate filler is aluminum borate.

3. A polyarylene sulfide resin composition as claimed in claim 1, wherein said particulate filler is blast furnace slag.

4. An optical pick-up part formed by molding the polyarylene sulfide resin composition as claimed in claim 2.

5. An optical pick-up part formed by molding the polyarylene sulfide resin composition as claimed in claim 3.

6. A polyarylene sulfide resin composition as claimed in claim 1, wherein said fibrous filler is contained at a proportion of from 15 to 30% by weight based on the total weight of said polyarylene sulfide resin composition.

7. A polyarylene sulfide resin composition as claimed in claim 1, wherein said particulate filler is contained at a proportion of from 35 to 50% by weight based on the total weight of said polyarylene sulfide resin composition.

8. A polyarylene sulfide resin composition which comprises, as main components, from 20 to 90% by weight of a polyarylene sulfide resin, from 10 to 75% by weight of a filler, from 0.05 to 5% by weight of a silane coupling agent and from 0.05 to 5% by weight of an alicyclic hydrocarbon.

9. A polyarylene sulfide resin composition as claimed in claim 8, wherein said alicyclic hydrocarbon is a hydrogenated alicyclic hydrocarbon.

10. A polyarylene sulfide resin composition as claimed in claim 8, wherein said alicyclic hydrocarbon is a compound represented by the general formula (1):

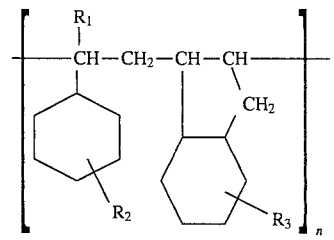

wherein $R_1$, $R_2$ and $R_3$ each represents a hydrogen atom or an alkyl group, and n is an integer, wherein said integer n is sufficient to provide an alicyclic hydrocarbon which, in combination with said silane coupling agent, improves tensile strength and Izod impact strength as compared to an otherwise identical polyarylene sulfide resin composition without said alicyclic hydrocarbon.

11. An optical pick-up part formed by molding the polyarylene sulfide resin composition as claimed in claim 8.

12. An optical pick-up part formed by molding the polyarylene sulfide resin composition as claimed in claim 9.

13. An optical pick-up part formed by molding the polyarylene sulfide resin composition as claimed in claim 10.

14. An optical pick-up part formed by molding the polyarylene sulfide resin composition as claimed in claim 1.

* * * * *